July 15, 1969   H. M. RUSH ET AL   3,456,092
METHOD OF BEAM ALIGNMENT AND WELDING OF
NON-ORTHOGONAL SECTION MEMBERS
Filed Dec. 29, 1966   3 Sheets-Sheet 1

INVENTOR.
H. M. RUSH
M. E. GERARD
BY
George E. Pearson
ATTORNEY

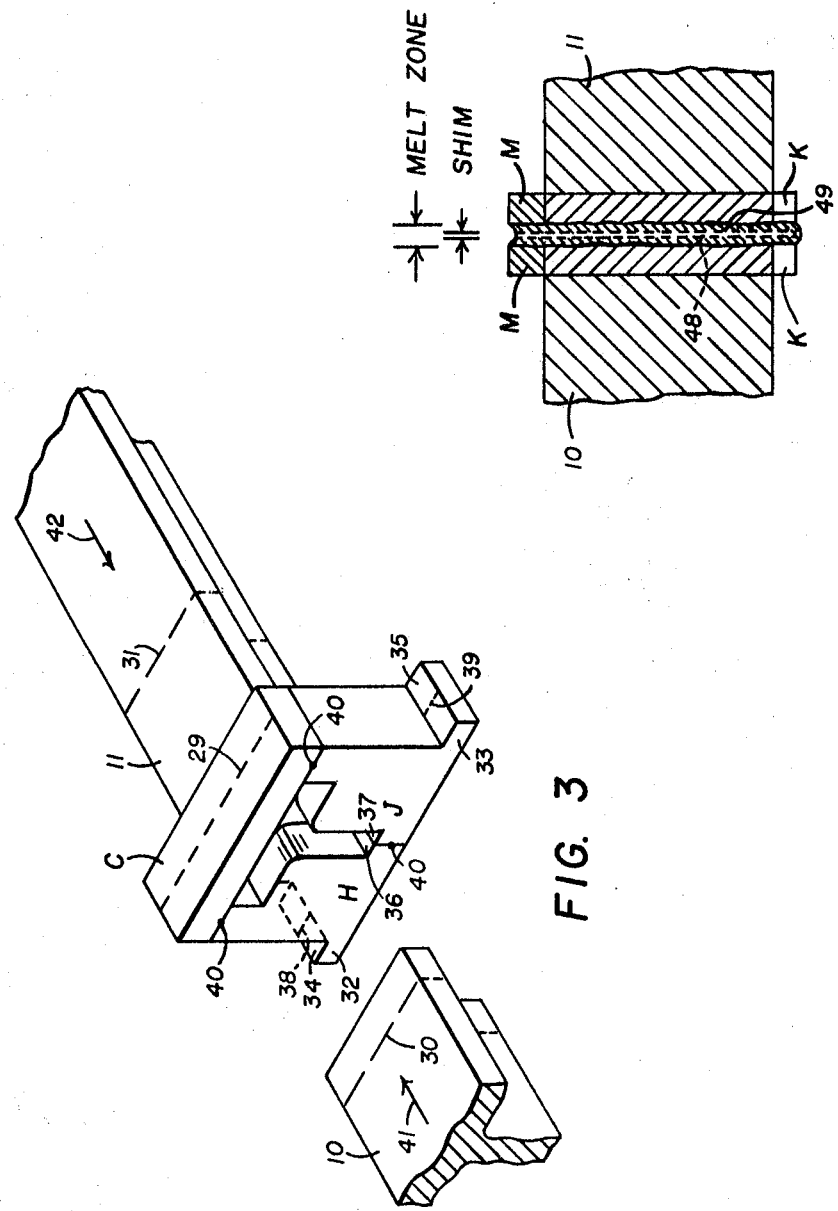

United States Patent Office 3,456,092
Patented July 15, 1969

---

3,456,092
METHOD OF BEAM ALIGNMENT AND WELDING OF NON-ORTHOGONAL SECTION MEMBERS
Hugh M. Rush, Coronado, and Milan E. Gerard, Chula Vista, Calif., assignor to Rohr Corporation, Chula Vista, Calif., a corporation of California
Filed Dec. 29, 1966, Ser. No. 605,728
Int. Cl. B23k 9/00
U.S. Cl. 219—121     10 Claims

ABSTRACT OF THE DISCLOSURE

Undercutting and drop out at the beam entry and exit surfaces of electron beam welded non-orthogonal sections are avoided by interfittingly enclosing the abutting end portions of the sections to be welded together with filler block and cap members which extend fore and aft of the beam entry and exit surfaces and, in one embodiment, also extend to opposite sides of the weld interface in the plane of the abutting end faces of the members. Scribe lines applied to the abutting members and to a cap filler member disposed at the point of entry of the beam provide a means of aligning the cap scribe line with the weld interface. The filler members form an orthogonal section which is laterally extended on opposite sides and near the bottom to provide surfaces for the marking of weld interface locating scribe lines to assure that the electron beam traverses the weld interface in the region of the beam exit surface of the abutting members. In a preferred embodiment, a shim having the same configuration as the orthogonal section and its lateral extensions, is interposed between the end faces of the orthogonal sections and their interfitted filler members, the shim in this case providing the beam tracer indicia in lieu of the scribe lines. Filler members disposed on opposite sides of the shim are secured together and to the shim. In either embodiment, the beam adjusted only at illuminating intensity may first be traced along the scribe lines or along the shim to assure that the assembly is aligned for traverse of the beam within the plane of the weld interface before the weld traverse of the beam is begun.

Background of the invention

This invention relates generally to the art of electron beam welding and more particularly to improvements in the alignment and welding of non-orthogonal section members such, for example, as T-section members.

It is customary in electron beam welding to focus the beam in accordance with the depth of the weld in the workpiece, the focus being set at the surface for thin workpieces and approximately at one-half the depth of the weld when the same is of the order of upwards of three quarters of an inch. Accordingly, when the depth of the weld varies over the width of the workpiece, that is, along the traverse of the beam, it may become necessary to re-focus the beam. Thus, in the welding of a pair of non-orthogonal section workpieces end-to-end, as in the case of welding T-section members of the order of two inches in cross section, the adjustment of the focus of the beam is required since the top arm and leg of the T present different depths to an electron beam which is directed parallel to the leg of the T and caused to traverse therethrough before and after traversing the shorter depths of the arm portions of the T.

To avoid need for readjustment of the focus of the beam, filler blocks have been assembled below the arms of the abutting T-section members and in overlapping relation to the interface therebetween to form a combined orthogonal section which presents a constant depth to the traversing beam. While this arrangement obviated need for readjustment of the focus, the resulting undercut and drop out conditions prevalent at the beam entry and exit surfaces of the abutting T members were undesirable. Accordingly, cap members were added to the aforesaid combined section to interpose weldable material fore and aft of the T-section members in the path of the traversing beam. By this arrangement, then, the objectionable undercutting and drop out surfaces which now appeared in the cap members were removed along with removal of the cap and block members after the T-section members were welded, thus leaving a smooth surface condition in the region of the original interface between the welded members.

Interposition of the cap members at the surfaces of entry and exit of the beam, however, obscured the interface between the members to be welded and introduced difficulties in bringing the traverse of the beam into alignment with the plane of the interface, it being essential that the beam traverse the interface in order to effectively weld the abutting members together. These difficulties were obviated by applying transverse scribe lines to the abutting members and to the cap piece disposed at the point of entry of the beam, it being thus possible by comparative reference to the scribed lines, to align the scribe line of the cap piece with the plane of the interface. By then tracing the beam along the cap piece scribe line, and assuming that the combined orthogonal assembly was positioned and mounted so that the path of the beam was parallel to the interface, it was possible to perform the welding with some degree of assurance that the beam traverse would pass through and along the interface.

Summary of the invention

In order, however, to make the alignment process independent of any fixturing arrangement for assuring parallelism of the beam path and interface, in accordance with the beam aligning process of the present invention, lateral projections are provided on the filler blocks, or lower cap piece, which projections are made to extend from the sides of the orthogonal combined section in the region of the beam exit surfaces of the parts to be welded. These projections thus present beam entry surfaces on opposite sides of the orthogonal section, that is, at the start and finish of the beam traverse. These laterally disposed beam entry surfaces are also marked with scribe lines which are carefully placed as by precise positioning of the filler blocks, to assure that the scribe lines fall within the plane of the interface of the abutting sections.

In this alignment arrangement, the beam is first traversed along the upper and lower scribe lines at low intensity sufficient only to illuminate the lines, but insufficient to melt the metallic surface. The beam traverse thus first traces along one of the laterally disposed lower scribe lines, and adjustments are made in the workpiece position, or in the electron gun position, as required, to bring the beam into alignment with this scribe line. The beam next moves along the upper scribe line on the cap piece and, again, such adjustments are made in the workpiece, or electron gun, as required, to assure that the beam traverse will precisely trace this upper scribe line. Finally, the scribe line on the opposite lower lateral projection is traced, and such adjustments are made, as before, to bring the beam into alignment with this scribe line. When thus aligned, the welding traverse of the beam is made and the same moves precisely through the interface.

The tracer beam and upper and lower scriber line method aforedescribed provides satisfactory results. The beam illuminated scribe lines, however, are somewhat difficult to follow optically from viewing ports available on the vacuum chamber. According to another feature of the invention, therefore, a shim formed of the same metallic materials as the non-orthogonal section parts to be welded, is interposed at the interface therebetween. This shim is given the same configuration as the orthogonal combined section comprising the filler blocks and including the aforedescribed lateral projections thereon whereby the shim now replaces the upper and lower scribe lines and more clearly delineates and locates the plane of the parts-interface. In this arrangement, the filler block and cap piece members are provided on opposite sides of the shim in enclosing relation to the non-orthogonal section member disposed thereat, and the filler block and cap piece members conveniently are secured together and to the shim to thus effectively retain the parts in assembly for welding. Since close abuttment of the parts is essential for effective welding at the interface, clamping forces preferably are also applied to the assembled section members.

Objects of the invention

An object of the invention therefore is to provide new and improved methods of electron beam alignment and welding of non-orthogonal section members.

Another object is to provide new and improved methods of alignment and welding which avoid undercutting and drop out in the beam entry and exit surfaces of electron beam weldments.

Still another object in the electron beam welding of abutting non-orthogonal section members resides in the provision of improved alignment and tracer beam methods for assuring parallelism of the beam traverse and parts-interface.

Still a further object resides in the provision of alignment methods for assuring precision of alignment in the depth dimension of the interface without requiring reliance upon fixturing for the purpose.

Yet another object in the electron beam welding of non-orthogonal sections is to provide new and improved means and methods for avoiding undercutting and drop out respectively at the beam entry and exit surfaces, for delineating and locating the plane of the parts-interface, and for holding the parts in assembled relation for the welding traverse of the beam.

Still other objects, features and advantages of the present invention will become more clearly apparent as the description proceeds, reference being had to the accompanying drawings wherein:

Brief description of the drawings

FIG. 2 is a vertical sectional view taken along lines 2—2 of FIG. 1;

FIG. 3 is a perspective view of parts partially assembled preparatory to alignment and welding of the same in accordance with an alternative embodiment of the invention.

Description of the invention

The drawings depict T-section members as being exemplary of non-orthogonal section members which are aligned and electron beam welded in accordance with the principles and concept of this invention. It will be understood, however, that the alignment and welding of other section members such, for example, as V, X and Z-sections also fall within the scope of this invention as defined by the claims appended hereto.

With reference to FIG. 4(b), a pair of T-section members 10 and 11 are disclosed in abutting engagement along the interface 12 to be penetrated by an electron beam to weld the members 10 and 11 together. The full lines in FIG. 4(a) identify the T-section profile of the members 10 and 11, and the dashed lines 13 depict the filler material required to convert the non-orthogonal T-section into an orthogonal section which would then present a constant depth of weld to the electron beam as depicted by the dimensional arrows designated by the letter $d$.

Figure 4:
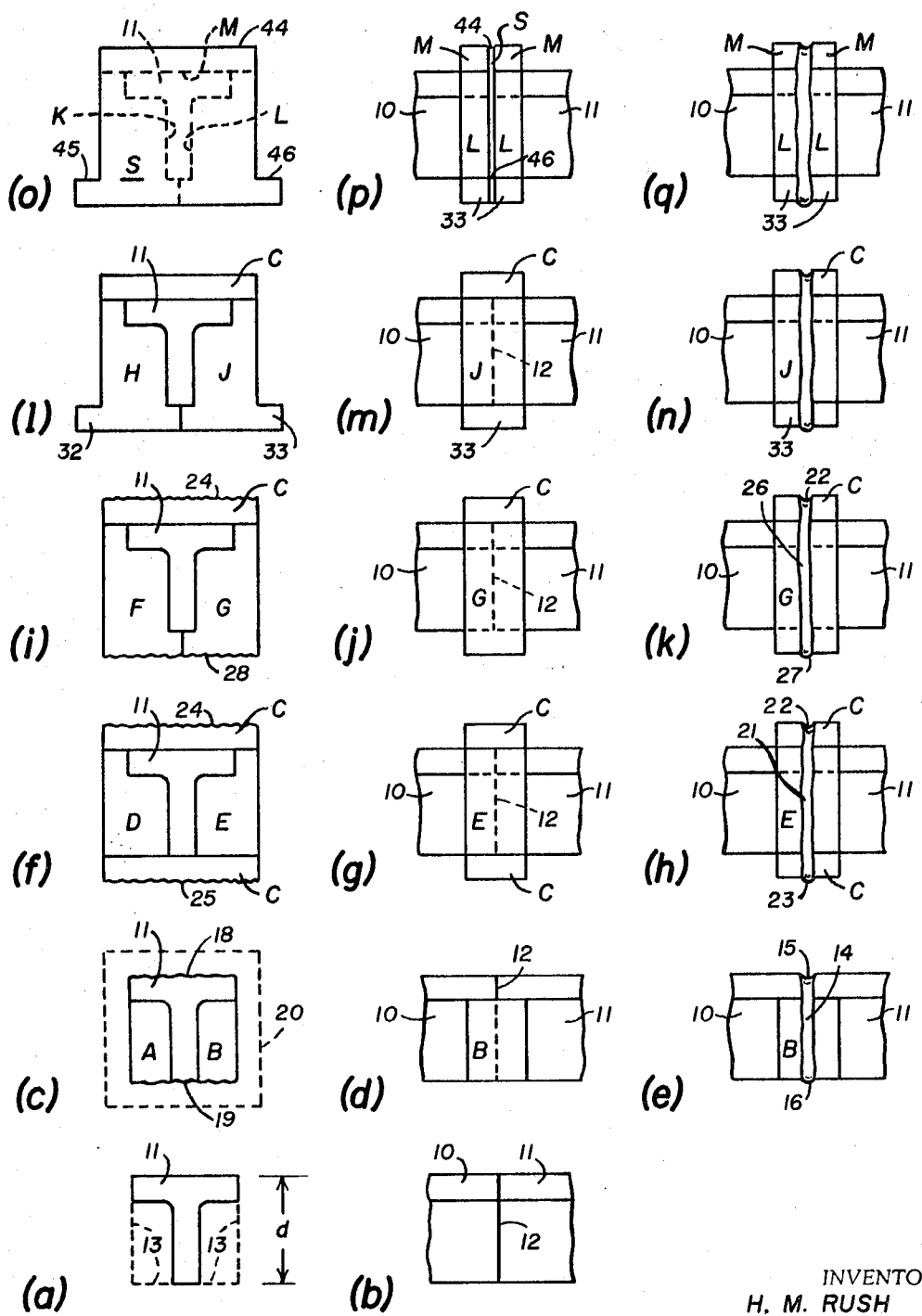
FIG. 4 is a diagrammatic view illustrating the evolution of the beam alignment and welding principles and concept applicable in the present invention.

In FIG. 4(c-e), filler blocks A and B have been added to the abutting members 10 and 11, these blocks overlying the interface 12, as best seen in FIG. 4(d). Upon welding traverse of the beam along the interface, a weld 14, FIG. 4(e), is formed which manifests undesired undercutting 15 and drop out 16 effects on the beam entry and exit surfaces 18 and 19, respectively, FIG. 4(c).

In order to avoid these undercutting and drop out conditions, the combined filler block and part configuration depicted by the full lines of FIG. 4(c) is enlarged as depicted by the dashed line 20 which fully encloses the T-section. As shown in FIG. 4(f-h), the orthogonal section 20 of FIG. 4(c) is achieved by the use of filler blocks D and E and upper and lower cap pieces C. The welding traverse of the beam forms a weld 21 in which the undercutting 22 and fall out 23 occur in the upper and lower cap pieces C at the beam entry and exit surfaces 24 and 25 thereof. Thus, when the cap piece and block members are cut and machined away after the weld 21 is formed, a resulting smooth T-section surface free of undercutting and drop out is obtained in the region of the interface 12.

In the arrangement of FIG. 4(i-k) filler blocks F and G, which enclose the beam exit surfaces of the T-section members 10 and 11, as best seen in FIG. 4(i), eliminate the need for the lower cap piece C of FIG. 4(f-h). In this case, a weld 26 is formed in which the undercut 22 occurs, as before, in the beam entry surface 24 of the upper cap piece C. The drop out 27, however, appears in the beam exit surfaces 28 of the filler blocks F and G.

As may be seen in FIG. 4(f-k), the cap piece and block members, which extend to both sides of the plane which passes through the interface 12, i.e., overlap the interface, obscure the interface so that there is no guide or reference on the beam entry surface 24 of cap piece C for directing the beam into the interface 12. Such a reference is provided by the scribed line 29, FIG. 3.

With reference to FIG. 3, two scribed lines 30 and 31 are provided on each of members 10 and 11. Scribed lines 30 and 31 are spaced from the ends of members 10 and 11 by one half the thickness of filler blocks F and G. Thus, lines 30 and 31 will appear at the sides of the blocks when the same are centered with respect to the interface between the closely abutted members. Lines 30 and 31 provide references for determining the precise alignment of the scribed line 29 on cap piece C with the parts-interface, and further may be used to measure any contraction or expansion of the welded joint.

Upon locating the upper cap piece C on the abutting members as aforedescribed, scribe line 29 which divides the cap piece, is made to fall within the plane of the parts-interface and thus provides a satisfactory guide for tracing and directing the beam over the beam entry surface 24. With the aid of proper fixturing for mounting and supporting the workpiece assembly, the beam traverse may be directed along scribe line 29 and into the parts-interface with assurance that the beam will pass within the plane of the interface.

Figure 1:
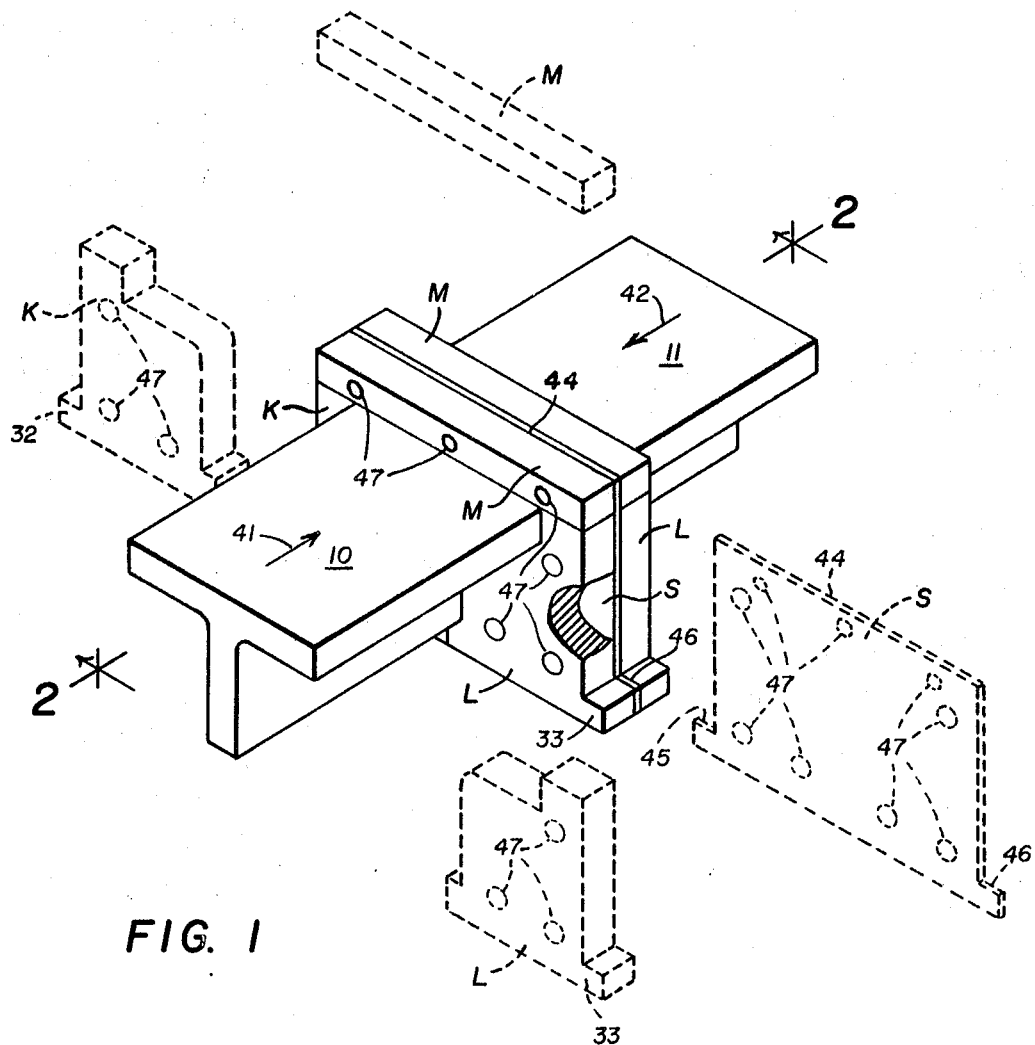
FIG. 1 is a view in perspective of a pair of T-section members assembled about a shim for electron beam alignment and welding of the parts together in accordance with a preferred embodiment of the invention.

The need for fixturing to assure alignment is obviated by the arrangement disclosed in FIGS. 1, 3 and 4(l-q) wherein filler blocks H and J and K and L are provided with lateral projections 32 and 33 which extend laterally on opposite sides of the orthogonal section comprised of the filler blocks and the parts to be welded. Projections 32 and 33 provide beam entry surfaces 34 and 35, FIG. 3, which are made to lie within the plane of the beam exit surfaces of the T-section members 10 and 11, this plane, for the sake of identification, being that which includes the surfaces 36 and 37 of FIG. 3. Beam entry surfaces 34 and 35 are marked with scribe lines 38 and 39 which are disposed so as to fall within the plane of the parts-interface which, as aforedescribed, includes the scribe line 29. When the electron beam thus traverses the scribe lines 38, 29, and 39 in alignment therewith, the beam will pass through and along the interface 12 between the abutting parts 10 and 11.

In order to assure that the welding traverse of the beam will be along the scribed lines 38, 29 and 39, the traverse of the beam therealong is first made at low intensity sufficient only to illuminate the scribe lines but insufficient to melt the surface. The illuminating tracer traverse serves to detect any deviations of the beam from the intended path along the scribe lines so that the location of the workpiece assembly may be shifted or otherwise adjusted to bring the beam traverse into alignment with the scribe lines, and therefore the interface plane, before the welding traverse of the beam is undertaken.

In the arrangement disclosed in FIG. 3, filler blocks H and J and cap piece C are assembled about one of the T-section members such as member 11, as shown, the scribe lines 30 and 31 being utilized comparatively with the sidewalls of the blocks H and J and cap piece C, as well as with the tracer scribe line 29, as aforedescribed, to align these members relative to the parts-interface. With the members thus aligned, the same are then secured together as by Tig tack welds applied on both sides of the members as at the points 40 which are suitably spaced from the T-section profile to avoid impairment therewith. The member 10 is then moved into the socket formed by the assembled filler block and cap members, and clamping pressure preferably is applied, as indicated by the arrows 41 and 42 to urge the members 10 and 11 into closely abutting relation at the resulting interface of their thusly adjacently disposed end faces.

In the preferred beam alignment and welding arrangement disclosed in FIGS. 1, 2 and 4(o-q), the need for the tracer beam scribe lines 38, 29, 39 of FIG. 3 is obviated by the use of the shim S which is formed of a compatible, that is, a material which is substantially the same as that of the T-section members 10 and 11. Shim S is disposed at the interface between the abutting members 10 and 11 and has the same configuration as the assembly of filler blocks K and L and cap piece M, including the aforementionel projections 32 and 33 on the filler blocks K and L, respectively. Thus, the upped edge 44 and laterally disposed edges 45 and 46 serve as beam tracer lines for guiding both the initial tracer traverse of the electron beam and the follow up welding traverse thereof along these surfaces. The guidance afforded by the shim, which has substantial thickness, is preferred to the somewhat more obscured scribe lines, and the shim is thus more readily illuminated by the beam and observed by the operator who must follow the beam traverse optically through available viewing ports providing in the vacuum chamber which is essential in the electron beam welding operation.

The shim, of course, inherently identifies the plane of the parts-interface and thus obviates the need for the locating scribe lines 30 and 31 of FIG. 3. Filler blocks K and L and cap piece M, as may best be seen in FIG. 1, are assembled on both sides of the shim and secured to each other and to the shim by suitable fasteners such, for example, as bolts (not shown) which are passed through the aligned holes 47 which extend through the shim and the adjacently disposed filler block and cap piece members.

The filler block and cap piece members K, L, and M, having thus been assembled around member 11, for example, member 10 is then moved into the resulting socket and clamping pressure applied in the direction of arrows 41 and 42, as before described, preparatory to performing the beam tracer and welding traverses.

With reference to FIG. 2, it may be seen that the dashed lines 48 through the weld zone 49 depict that portion of the welded joint which has been contributed by the shim, and it may be noted comparatively that the weld zone is considerably wider than the shim zone, thus affording proof that the traversing beam has passed through and along the parts-interface.

The invention herein described is particularly applicable to the electron beam welding of the exotic metals, super alloys and titanium but is not limited thereto. It will be apparent, moreover, that methods of beam alignment and welding have been disclosed which are well adapted to fulfill the aforestated objects of the invention, and while certain examples of the invention have bene disclosed which give satisfactory results, will be apparent that the same may be embodied in other forms or carried out in other ways without departing from the spirit or essential characteristics thereof. The present embodiments of the invention is therefore to be considered in all respects as illustrative and not restrictive, the scope of the invention being indicated by the appended claims, and all changes coming within the meaning and range of equivalency of the claims are intended to be embraced therein.

Having thus described the invention, what is claimed as new and useful and desired to be secured by Letters Patent is:

1. The method of electron beam alignment and welding of non-orthogonal section members comprising the steps of abutting a pair of metallic non-orthogonal section members at an interface to be traversed by an electron beam for welding said members together, interfittingly enclosing said abutting non-othogonal members with filler members to form therewith a combined orthogonal section having substantially the same metallic material, throughout the section, extending said filler members to each side of said interface and respectively fore and aft of the beam entry and exit surfaces of said abutting members, laterally extending the sides of said orthogonal section in the region of said beam exit surfaces of the non-orthogonal members to provide laterally disposed beam entry surfaces, marking the beam entry surfaces of the orthogonal section and said laterally disposed surfaces thereof with beam tracer indicia means disposed in alignment with the plane of said interface, and traversing an electron beam at welding intensity and focus along said beam tracer indicia means and through said interface thereby to weld said non-orthogonal section members together.

2. The method of beam alignment and welding as in claim 1 and comprising the further step of removing the filler materials from the non-orthogonal members when the welding thereof has been completed, thereby to restore the non-orthogonal section profile of said members in the region of said interface.

3. The method of beam alignment and welding as in claim 1 and comprising the pre-weld step of traversing the electron beam along said beam tracer indicia means at low intensity sufficient only to illuminate the same thereby to assure alignment of the beam with said plane of the interface prior to said welding traverse of the beam therethrough.

4. The method of beam alignment and welding as in claim 1 and wherein said beam tracer indicia means comprise scribe lines marked on said beam entry surfaces of the orthogonal section.

5. The method of beam alignment and welding as in claim 1 and wherein said filler members comprise a cap member having said beam entry surface of the orthogonal section, and a pair of block members having said laterally disposed beam entry surfaces at the side extensions of the orthogonal section, and wherein said method further comprises the step of securing said cap and block members together in assembled relation about said abutting non-orthogonal section members.

6. The method of beam alignment and welding as in claim 5 and comprising the further steps of scribing tracer beam lines on the beam entry surfaces of the cap and block members, scribing transverse reference lines on the abutting-orthogonal section members and assembling said cap and block members on said abutting members with comparative reference to their respective scribed lines thereby to bring said tracer beam lines within the plane of said interface of the abutting members.

7. The method of electron beam alignment and welding of a pair of metallic non-orthogonal section members at an interface region to be traversed by an electron beam for welding said members together, comprising the steps of interfittingly enclosing the end portion adjacent the end face to be welded of each of said non-orthogonal members with filler members to form therewith a combined orthogonal section having substantially the same metallic materials throughout the section, extending said filler members respectively fore and aft of the beam entry and exit surfaces of their associate non-orthogonal member, laterally extending the sides of each said orthogonal section in the region of said beam exit surface of its associated non-orthogonal member to provide laterally disposed beam entry surfaces, aligning and spacing said orthogonal sections and said end faces of their non-orthogonal members in face adjacency to define said interface region therebetween, interposing between said aligned and spaced orthogonal sections a metallic shim having the configuration of said orthogonal sections and their lateral side extensions, said shim having substantially the same metallic materials as said non-orthogonal members, and traversing an electron beam at welding intensity and focus along said shim and through said interface region thereby to weld said non-orthogonal section members together.

8. The method of beam alignment and welding as in claim 7 and comprising the further step of securing said filler members together and to said shim.

9. The method of beam alignment and welding as in claim 8 and comprising the further steps of traversing the beam along the shim at reduced illuminating intensity prior to traversing the same at welding intensity, and removing the filler materials from the non-orthogonal section members when the welding of the same is completed.

10. The method of beam alignment and welding as in claim 1 and comprising the further step of forcibly abutting the non-orthogonal members at said interface thereof.

References Cited
UNITED STATES PATENTS 1,512,787  10/1924  Morton _____ 219—137

JOSEPH V. TRUHE, Primary Examiner

W. DEXTER BROOKS, Assistant Examiner